United States Patent
Suzuki et al.

(10) Patent No.: US 8,069,773 B2
(45) Date of Patent: Dec. 6, 2011

(54) PISTON

(75) Inventors: Takao Suzuki, Numazu (JP); Shoji Kanai, Ueda (JP)

(73) Assignees: Toyota Jidosha Kabushiki Kaisha, Toyota-shi, Aichi-ken (JP); Art Metal Mfg. Co., Ltd., Nagano-Ken (JP)

( * ) Notice: Subject to any disclaimer, the term of this patent is extended or adjusted under 35 U.S.C. 154(b) by 694 days.

(21) Appl. No.: 12/179,932

(22) Filed: Jul. 25, 2008

(65) Prior Publication Data

US 2009/0025549 A1     Jan. 29, 2009

(30) Foreign Application Priority Data

Jul. 26, 2007  (JP) ................................. 2007-195075

(51) Int. Cl.
*F01B 31/10*  (2006.01)
(52) U.S. Cl. ............................................ 92/158; 92/155
(58) Field of Classification Search ............. 92/153, 92/155, 158, 212
See application file for complete search history.

(56) References Cited

U.S. PATENT DOCUMENTS

| 3,521,531 A * | 7/1970 | Kaesemodel | 92/158 |
| 2005/0087166 A1 * | 4/2005 | Rein et al. | 92/223 |

FOREIGN PATENT DOCUMENTS

| JP | 4-88750 | 7/1992 |
| JP | 2001-182612 | 7/2001 |
| JP | 2005-320934 | 11/2005 |

* cited by examiner

*Primary Examiner* — Michael Leslie
(74) *Attorney, Agent, or Firm* — Finnegan, Henderson, Farabow, Garrett & Dunner, LLP

(57) ABSTRACT

A piston is equipped with a skirt that has a sliding surface provided with an oil repellent resin layer. A solid lubricating resin layer and the oil repellent resin layer are exposed on the sliding surface. On the sliding surface, the oil repellent resin layer extends at an incline with respect to the centerline of the sliding surface in a circumferential direction of the piston.

10 Claims, 14 Drawing Sheets

PISTON

INCORPORATION BY REFERENCE

The disclosure of Japanese Patent Application No. 2007-195075 filed on Jul. 26, 2007 including the specification, drawings and abstract is incorporated herein by reference in its entirety.

BACKGROUND OF THE INVENTION

1. Field of the Invention

The invention relates to a piston for use in an internal combustion engine. More specifically, the invention relates to a piston whose skirt has a sliding surface on which a layer of a coating material is formed.

2. Description of the Related Art

A piston for use in an internal combustion engine is usually provided with a piston skirt (hereinafter referred to simply as "a skirt") to suppress the oscillation of the piston within the cylinder bore. The skirt slides along an inner wall surface of the cylinder bore (hereinafter referred to as a cylinder wall) and is flexibly deformed, thereby restraining the friction between the piston and the cylinder wall from increasing while suppressing the oscillation of the piston.

To reduce the friction between the piston and the cylinder wall, the skirt is required to be flexibly deformed to an appropriate degree, and is usually constructed of a thin wall body. To reinforce an end portion of the sliding surface of the skirt in a circumferential direction of the piston (hereinafter referred to as a sliding surface circumferential end portion), the piston is generally provided with a connection wall that connects the sliding surface circumferential end portion to a piston pin boss. These components, namely, the connection wall, the skirt, and the piston pin boss extend from the piston head. In the following description, the region of the end of the skirt that is most distant from the piston head is referred to as "a tail" of the skirt. The central portion of the sliding surface of the skirt in the circumferential direction of the piston is referred to as "a sliding surface central portion".

In the piston thus constructed, with a view to reducing the sliding resistance between the skirt and the cylinder wall, it is known to form a layer of a coating material such as resin or the like on the sliding surface of the skirt. Furthermore, an uncoated groove-like section may be formed in the sliding surface, into which lubricating oil is introduced (e.g., see Japanese Utility Model Application Publication No. 4-88750 (JP-U-4-88750) and Japanese Patent Application Publication No. 2005-320934 (JP-A-2005-320934)).

In the piston described in Japanese Utility Model Application Publication No. 4-88750 (JP-U-4-88750), a layer of a resin coating material is formed on a sliding surface that slides along the cylinder wall. Furthermore, in the piston of Japanese Utility Model Application Publication No. 4-88750 (JP-U-4-88750), a section where the layer of the resin coating material is not formed (a non-coated portion) extends like a groove from a tail side of a sliding surface circumferential end portion toward the top face of the piston head of a central portion of a skirt in a circumferential direction thereof. By providing this non-coated groove-like portion, oil adhering to the cylinder wall is introduced into the non-coated portion as the piston reciprocates, and is supplied to the sliding surface.

In a piston described in Japanese Patent Application Publication No. 2005-320934 (JP-A-2005-320934), convex sections where a layer (coat) of a solid lubricating material containing molybdenum disulfide and the like exists and concave sections where the layer (coat) of the solid lubricating material does not exist are alternately provided along a sliding surface (outer peripheral surface) of a skirt. Lubricating oil is retained in the concave sections and supplied to the convex sections to thereby enhance the abrasion resistance of the sliding surface of the skirt and reduce the sliding resistance thereof.

A piston for an internal combustion engine is deformed through the heat received during operation of the internal combustion engine. In consideration of this thermal deformation, a skirt of the piston is formed, in a cold condition, in the shape of an ellipse having a minor axis in a direction in which a pin hole of a piston pin boss extends (hereinafter referred to as a piston pin axial direction) and a major axis in a direction in which a thrust force and a counter thrust force act (hereinafter referred to as a thrust direction). The piston thus assuming the shape of the ellipse in the cold condition receives heat from a gap between corresponding ones of a plurality of cylinder bores formed in the internal combustion engine, expands in the piston pin axial direction. As a result, the shape of the piston becomes substantially circular.

A skirt of this piston is constructed such that a top portion of a sliding surface of the skirt is located closer to a central axis of the piston than a tail of the skirt. The top portion of an outer peripheral surface of the skirt becomes deformed outward in a radial direction of the piston due to the heat received from the top portion during operation of the internal combustion engine. The contact pressure that the outer peripheral surface of the skirt receives from a cylinder wall can thereby be made homogeneous.

If an internal combustion engine having a piston constructed as described above is operated at a low rotational speed or under a low load, especially on a top portion side of a circumferential end portion of a sliding surface (hereinafter referred to as a sliding surface circumferential end portion), the gap (hereinafter referred to as a clearance) between the sliding surface circumferential end portion and a cylinder wall is larger with a larger oil film thickness in comparison with other regions of an outer peripheral surface of a skirt. When there is a region having a thicker oil film than the other regions as described above, there is caused a problem in that the shearing resistance of oil is strong, namely, that the sliding resistance on the cylinder wall is strong. Further, owing to the large clearance between the outer peripheral surface of the skirt and the cylinder wall, there is also caused a problem in that a loud slapping sound is produced upon abutment of the outer peripheral surface of the skirt on the cylinder wall.

When the internal combustion engine is operated at a high rotational speed or under a high load, the clearance between a sliding surface central portion and the cylinder wall is smaller and the oil film is thinner in comparison with the other regions of the outer peripheral surface of the skirt, due to thermal expansion of the piston in the thrust direction. Thus, there is an increased likelihood that the sliding surface central portion may suffer abrasion or seizure.

Accordingly, in the piston for use in the internal combustion engine, there is a demand for an art capable of making the thickness of the oil film on the outer peripheral surface of the skirt as homogeneous as possible by introducing lubricating oil on the sliding surface circumferential end portion of the outer peripheral surface of the skirt to the sliding surface central portion.

SUMMARY OF THE INVENTION

The invention provides a piston that introduces lubricating oil on a sliding surface circumferential end portion of a skirt to a sliding surface central portion of the skirt.

A piston according to a first aspect of the invention is designed for use in an internal combustion engine. A sliding surface of the piston is equipped with a skirt provided with an oil repellent resin layer. The oil repellent resin layer extends at an incline with respect to a sliding surface centerline in a circumferential direction of the piston.

In the piston according to the foregoing first aspect of the invention, a solid lubricating resin layer and the oil repellent resin layer may be exposed on the sliding surface layer, and the oil repellent resin layer may exhibit higher oil repellency than the solid lubricating resin layer.

The oil repellent resin layer may be located closer toward the skirt tail with increasing distance from a sliding surface circumferential end portion, which is an end portion of the sliding surface in a circumferential direction of the piston, toward the sliding surface centerline.

The guide groove may be a formed in the sliding surface and may extend at an incline with respect to the sliding surface centerline from the sliding surface circumferential end portion toward a sliding surface central portion to introduce lubricating oil from the sliding surface circumferential end portion to the sliding surface central portion. The oil repellent resin layer may be exposed over at least part of the bottom of the guide groove.

The guide groove may have a plurality of inclined portions that extend at an incline with respect to the sliding surface central line, and a connection portion that connects the ends of the respective inclined portions on the sliding surface centerline side to one another.

The oil repellent resin layer may be, at the ends of the inclined portions that are located closest to a top portion side, in contact with a wall surface defining a shape of an oil ring groove.

The sliding surface may be constructed by superimposing a plurality of resin layers over the base material of the piston. The oil repellent resin layer may be provided directly over the base material. The solid lubricating resin layer may be provided directly over the oil repellent resin layer. The guide groove may be formed in the solid lubricating resin layer. The oil repellent resin layer may be exposed along the bottom of the guide groove.

According to the aspect of the invention, a large amount of oil adhering to the end portion of the sliding surface in the circumferential direction may be introduced to the sliding surface central portion by the oil repellent resin layer that is exposed in the sliding surface, and the thickness of an oil film on the sliding surface of the skirt may be made as even as possible.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

The invention will be described hereinafter in detail with reference to the drawings. The invention should not be construed as being limited to the embodiments described. Although the elements of the example embodiments are shown in various combinations and configurations, the invention includes all alternative combinations and configurations that fall within the scope of the invention as defined by the appended claims.

Figure 1:
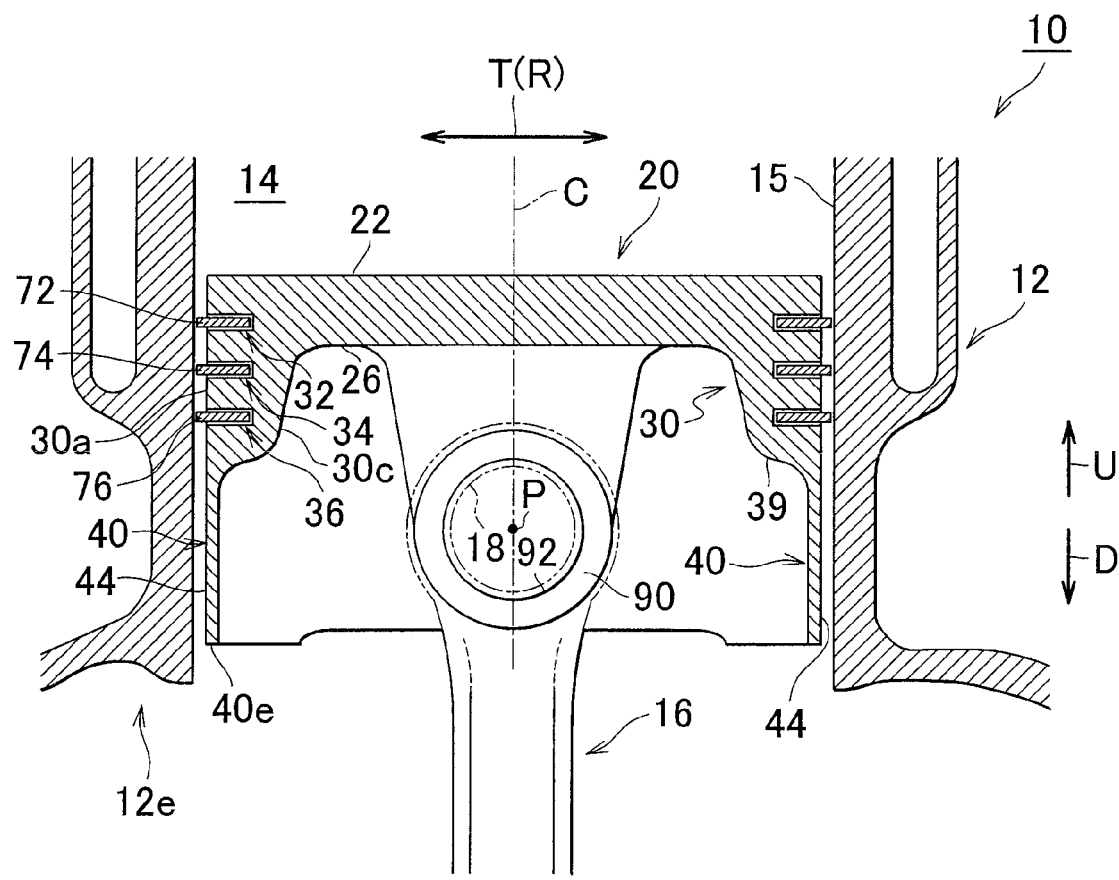
FIG. 1 is a cross-sectional view showing the structure of an area around a piston for an internal combustion engine according to the first embodiment of the invention.

The structure of a piston according to the first embodiment of the invention will be described with reference to FIG. 1. FIG. 1 is a cross-sectional view showing the construction of an area around the piston in an internal combustion engine. FIG. 1 schematically shows only those portions relevant to the invention.

As shown in FIG. 1, an internal combustion engine 10 has a cylinder block 12, a piston 20, a connecting rod 16 (indicated by alternate long and two short dashes lines in FIG. 1), a crankshaft (not shown), a cylinder head (not shown), and the like, that constitute the engine. A cylinder bore 14 is formed through the cylinder block 12. The piston 20 reciprocates within the cylinder bore 14. In addition, piston rings, to be described later, are fitted to the piston and slides along an inner wall surface 15 of the cylinder bore 14 (hereinafter referred to as a cylinder wall 15). The piston 20 is connected to the connecting rod 16 by a piston pin 18 so as to oscillate. The internal combustion engine 10 converts mechanical power received by the piston 20 into a rotary motion of the crankshaft and outputs the converted power.

The cylinder head (not shown) is coupled to the cylinder block 12 and thereby closes off the cylinder bore 14, facing a top surface 22 of the piston 20. A crank case (not shown) for accommodating the crankshaft is formed in the cylinder block 12, facing a surface 26 on the back of the top surface 22 of the piston 20 (hereinafter referred to as a ceiling surface).

The piston 20 is inserted in the cylinder bore 14 such that a central axis (indicated by alternate long and short dash lines C in FIG. 1) of the piston 20 coincides with an axial center of the cylinder bore 14. In the following description, a direction along the axial center of the cylinder bore 14, namely, the central axis C of the piston 20 is referred to as "axial direction of a piston". A radial direction of the cylinder bore 14, namely, a radial direction of the piston 20 is referred to simply as "radial direction of a piston" and indicated by an arrow R in FIG. 1.

In the axial direction of the piston, an orientation in which the piston 20 moves toward the cylinder head is referred to as "a head side" and indicated by an arrow U in FIG. 1. Conversely, an orientation in which the piston 20 moves toward the crank case is referred to as "a crank side" and indicated by an arrow D in FIG. 1.

Piston rings such as compression rings 72 and 74 and an oil ring 76 are fitted to an outer peripheral surface 30a of a piston head 30 and held slidably along the cylinder wall 15. "The piston head" 30 is that section of the piston 20 which is located on the head side in the axial direction of the piston and includes the top surface 22, and is a so-called piston crown.

A top ring groove 32, a second ring groove 34, and an oil ring groove 36 are formed in the outer peripheral surface 30a of the piston head 30 such that a top ring 72 and a second ring 74 as the compression rings and the oil ring 76 can be fitted therein respectively.

Among the plurality of the ring grooves 32, 34, and 36 formed in the outer peripheral surface 30a of the top portion, the oil ring groove 36 is formed closest to a crank side, namely, nearest the skirt tail 40e. The oil ring groove 36 is formed over an entire circumference of the outer peripheral surface 30a of the piston head 30.

The oil ring 76 fitted in the oil ring groove 36 slides along the cylinder wall 15 and functions to scrape surplus lubricating oil (hereinafter referred to simply as "oil") from the cylinder wall 15. Part of the oil scraped from the cylinder wall 15 by the oil ring 76 is brought into the oil ring groove 36.

The piston 20 is provided with a piston pin boss 90 (hereinafter referred to as "a pin boss") for rotatably retaining the piston pin 18. A piston pin hole 92 (hereinafter referred to as "a pin hole") into which the piston pin 18 is inserted is formed through the pin boss 90. The pin boss 90 is formed on the ceiling surface of the piston head 30 and extends along the radial direction of the piston.

The pin boss 90 is connected to a later-described connection wall in a piston circumferential direction G. A force received from the top face 22 by the piston 20 is transmitted from the pin hole 92 of the pin boss 90 to the connecting rod 16 via the piston pin 18 (indicated by alternate long and two short dashes lines in FIG. 1). In the following description, the direction of the central axis of the pin hole 92, formed through the pin boss 90, will referred to as the "piston pin axial direction" and indicated by an arrow P in FIG. 1. In addition, the direction perpendicular to the piston pin axial direction P and the piston central axis C and in which a thrust force and a counter thrust force act between the piston and the cylinder wall is referred to as a "thrust direction" and indicated by an arrow T in FIG. 1.

To suppress the oscillation of the piston 20 within the cylinder bore 14, a skirt 40 is provided on the crank side of the piston 20 with respect to the piston head 30. The skirt 40 extends from the piston head 30 toward the crank in the piston axial direction. In the following description, that region of the skirt 40 that is located closest to the crank side in the piston axial direction is referred to as the "tail" of the skirt 40 and denoted by a reference symbol 40e.

In the following description, an outer peripheral surface of the skirt 40 that is curved with substantially the same curvature as the outer peripheral surface 30a of the piston head 30 and faces the cylinder wall 15 when the piston 20 is provided within the cylinder bore 14 is referred to as "a sliding surface" and denoted by a reference symbol 44. At least part of the sliding surface 44 of the skirt 40 slides along the cylinder wall 15, and the oscillation of the piston is thereby suppressed. Details of the sliding surface 44 will be described later.

Figure 2:
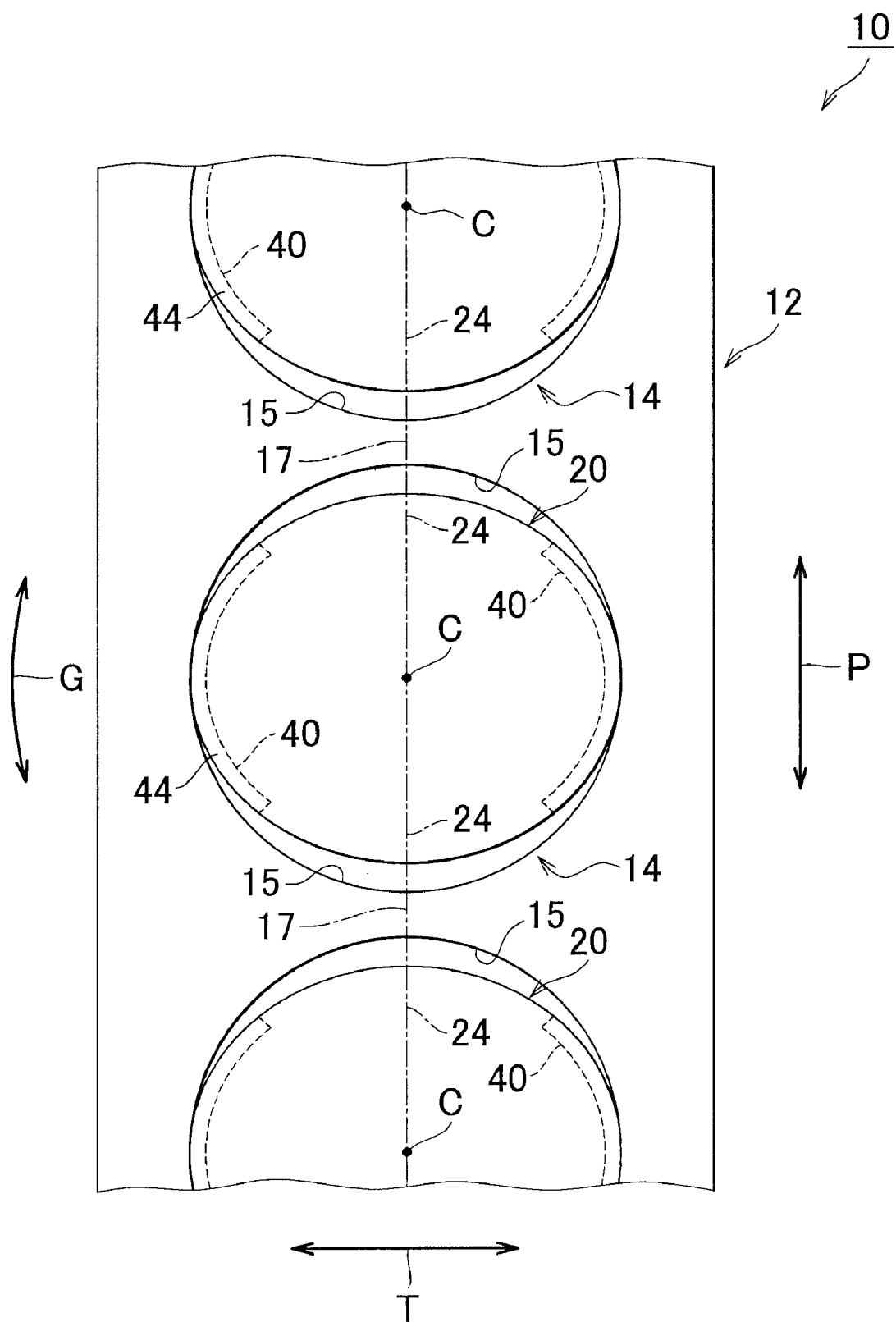
FIG. 2 is a view showing the shape of the piston skirt when cold.
Figure 3:
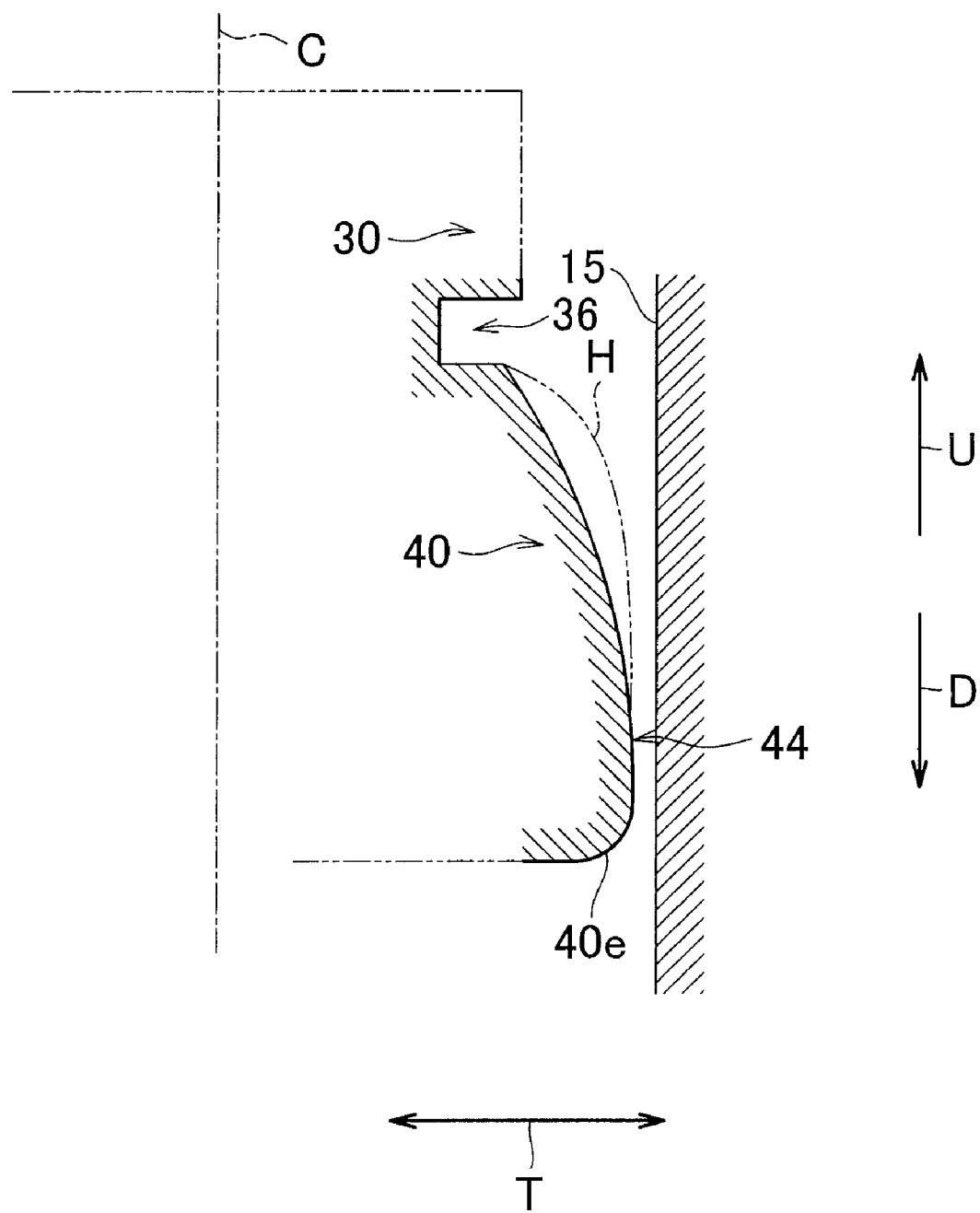
FIG. 3 is a view showing the cross-sectional shape of the piston skirt when cold.

Next, the shape of the piston skirt when cold will be described with reference to FIGS. 2 and 3. FIG. 2 is a view showing the shape of the piston skirt when cold. FIG. 3 is a view showing the cross-sectional shape of the piston skirt when cold. In FIG. 2, each skirt is indicated by broken lines, and the pin boss and the like are not shown. The circumferential direction of the cylinder bore 14, namely, the circumferential direction around the central axis C of the piston 20 is referred to as "a piston circumferential direction" and indicated by an arrow G in FIG. 2.

As shown in FIG. 2, a plurality of cylinder bores 14 are provided in a row in the cylinder block 12 of the internal combustion engine 10 in the direction in which the crankshaft extends, namely, the piston pin axial direction P. A piston 20 is disposed within each cylinder bore 14. During operation of the internal combustion engine 10, the cylinder block 12 is higher in temperature in each region 17 between adjacent ones of the cylinder bores 14 than in the other regions. Thus, a region 24 of the piston 20 that is located in the piston pin axial direction P with respect to the piston central axis C receives heat from the region 17 between corresponding adjacent ones of the cylinders 14, and is thermally deformed in the piston pin axial direction P.

Thus, the skirt 40 is formed generally in the shape of an ellipse having a minor axis in the piston pin axial direction P and a major axis in the thrust direction T when the piston 20 is cold. When the skirt 40 receives heat from the region 17 between corresponding adjacent ones of the cylinder bores 14, the skirt 40 expands in the piston pin axial direction P. As a result, the shape of the skirt 40 becomes more circular.

The piston head 30 is heated by the combustion gas that is burned within the cylinder bore 14. The heat is transferred from the piston head 30 toward the tail 40e of the skirt 40. Thus, the temperature of the region of the skirt 40 located near the piston head 30 is higher than that of the region of the skirt 40 located near the skirt tail 40e, and is likely to be thermally deformed in the thrust direction T as indicated by alternate long and two short dashes lines H in FIG. 3.

Thus, as shown in FIG. 3, the skirt 40 is structured such that that region of the sliding surface 44 located near the piston head 30 is located nearer the piston central axis C with respect to that region of the sliding surface 44 that is located near the skirt tail 40e when the piston 20 is cold. That is, the clearance between the sliding surface 44 of the skirt 40 and the cylinder wall 15 is greater in that region of the sliding surface 44 located near the piston head side than that of the region of the sliding surface 44 located near the skirt tail 40e. The skirt 40 shaped in the manner described receives heat from the piston head 30, and that region of the sliding surface 44 which is located near the piston head 30 is deformed in the thrust direction T (the shape of the deformed sliding surface 44 is indicated by the alternate long and two short dashes lines in FIG. 3). The sliding surface 44 thereby assumes a shape approximately corresponding to the cylinder wall 15.

Figure 4:
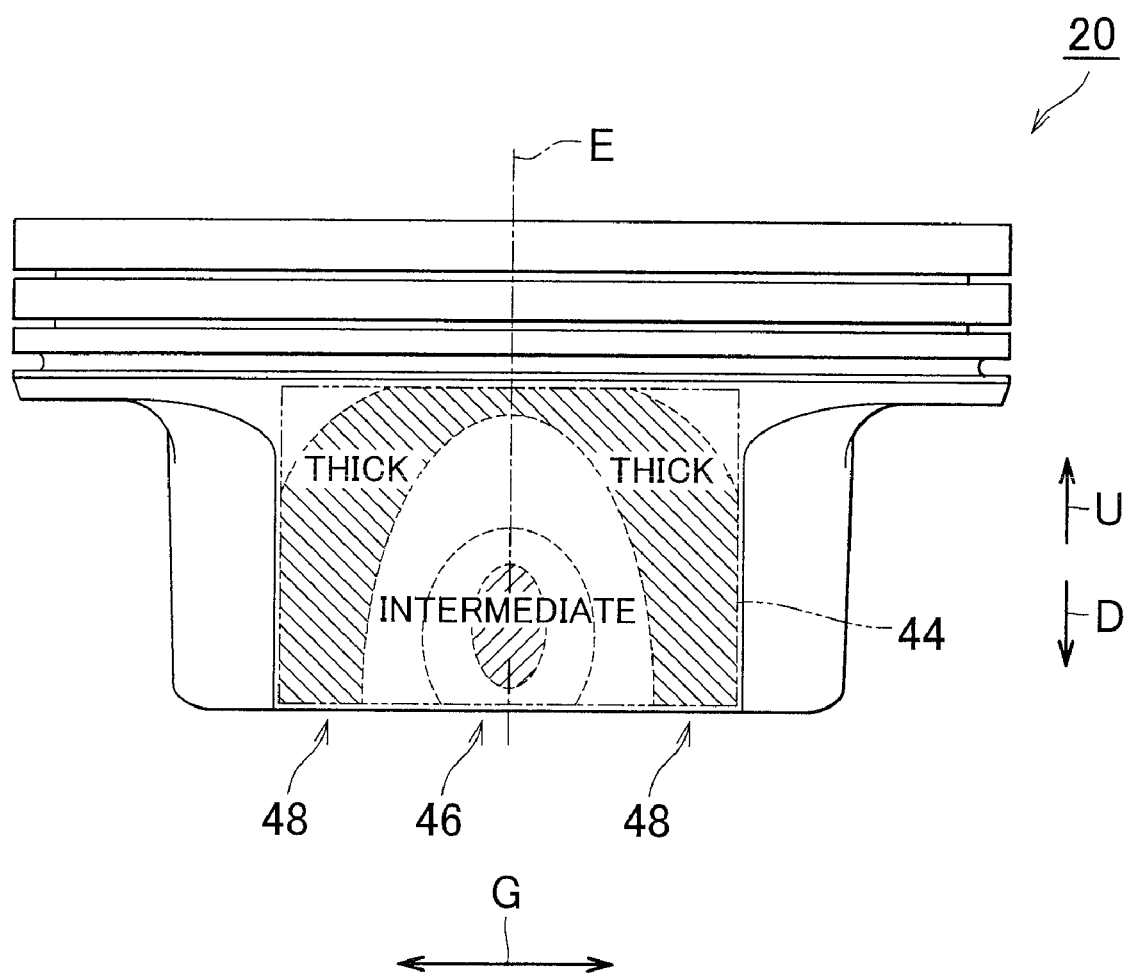
FIG. 4 is a view showing the distribution of the thickness of an oil film on a sliding surface of the skirt when the internal combustion engine is operated at a low rotational speed or under a low load.
Figure 5:
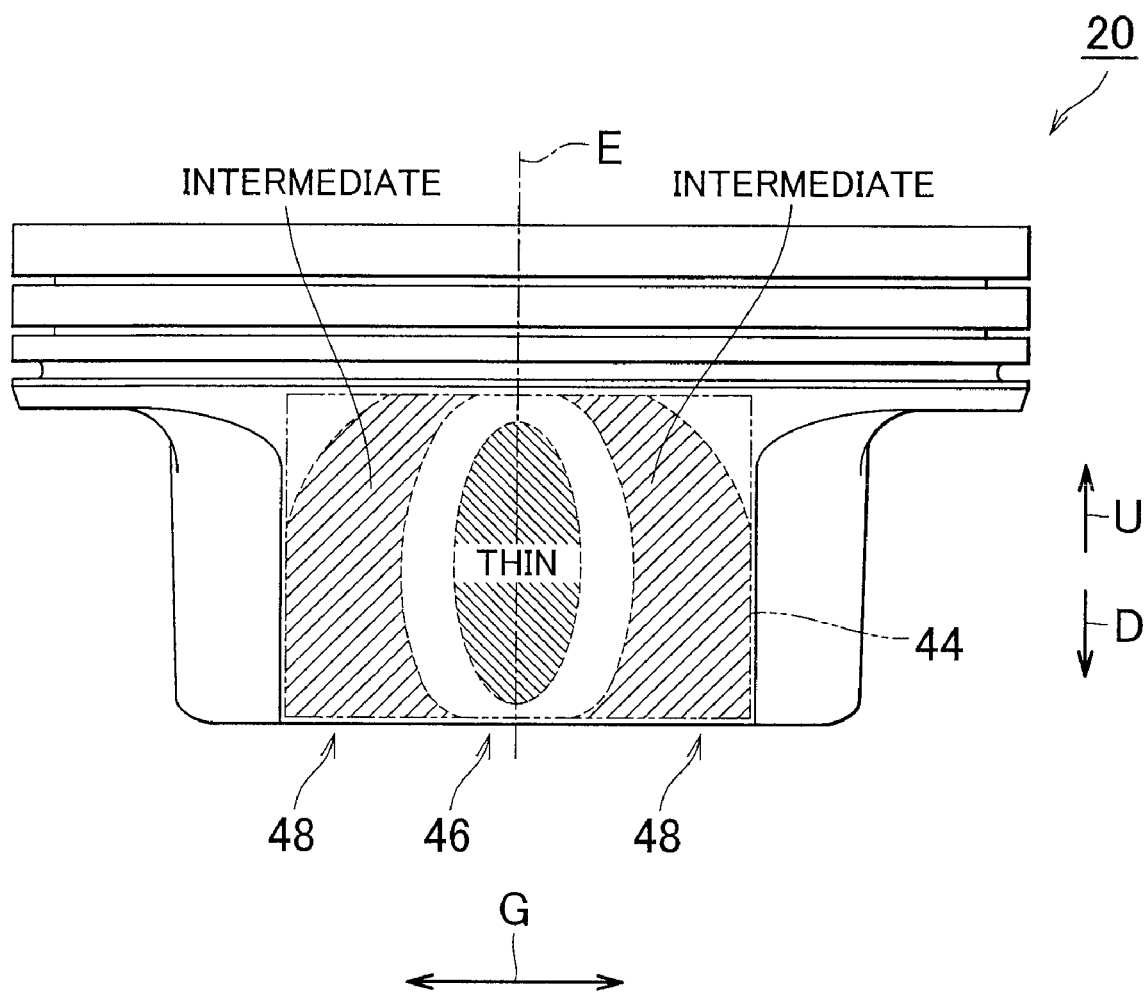
FIG. 5 is a view showing the distribution of the thickness of the oil film on the sliding surface of the skirt when the internal combustion engine is operated at a high rotational speed or under a high load.

The piston 20 having the skirt 40 thus structured becomes thermally deformed in accordance with the operational state of the internal combustion engine 10, and the clearance between the piston 20 and the cylinder wall 15 changes. As a result, the thickness of an oil film adhering to the sliding surface 44 changes. The distribution of the thickness of the oil film on the sliding surface of the skirt in respective operational states of the internal combustion engine will be described hereinafter using FIGS. 4 and 5. FIG. 4 is a view showing the distribution of the thickness of the oil film on the sliding surface of the skirt when the internal combustion engine is operated at a low rotational speed or under a low load. FIG. 5 is a view showing the distribution of the thickness of the oil film on the sliding surface of the skirt when the internal combustion engine is operated at a high rotational speed or under a high load.

In the following description, a line of the sliding surface 44 of the skirt that indicates the center in the piston circumferential direction G is referred to as "a sliding surface centerline" and indicated by alternate long and short dash lines E in FIGS. 4 and 5. The sliding surface centerline E extends past the sliding surface 44 of the skirt, and is substantially parallel to the piston central line C shown in FIG. 1.

In the following description, a central portion of the sliding surface 44 of the skirt in the piston circumferential direction G is referred to as "a sliding surface central portion" and denoted by a reference symbol 46. The sliding surface central portion 46 is an area of the sliding surface 44 of the skirt that includes the sliding surface centerline E. In the following description, an end portion of the sliding surface 44 of the skirt in the piston circumferential direction G is referred to as "a sliding surface circumferential end portion" and denoted by a reference symbol 48.

If the internal combustion engine 10 operates at a low rotational speed or under a low load, as shown in FIG. 4, the sliding surface central portion 46 of the skirt 40, especially the region near the skirt tail 40e, has the smallest clearance between the sliding surface 44 and the cylinder wall 15 (see FIG. 2) and the most appropriate thickness of the oil film (indicated by "INTERMEDIATE" in FIG. 4). The clearance between the sliding surface 44 and the cylinder wall 15, namely, the thickness of the oil film, increases with increasing distance from the sliding surface centerline E toward the sliding surface circumferential end portion 48 in the piston circumferential direction G. As indicated by THICK in FIG. 4, the sliding surface circumferential end portion 48 has an area in which the thickness of the oil film exceeds the thickness of the oil film in the other regions.

In the aforementioned area having the excessively large thickness of the oil film, the shearing force of oil is large. Therefore, the sliding resistance (friction) between the sliding surface 44 of the skirt 40 and the cylinder wall 15 is strong. In this area, the clearance between the sliding surface 44 and the cylinder wall 15 is large. Therefore, the sliding surface 44 may strike the cylinder wall 15, thereby producing an undesirable slapping sound.

On the other hand, when the internal combustion engine 10 operates at a high rotational speed or under a high load, as shown in FIG. 5, the sliding surface circumferential end portion 48 of the skirt 40 is an area where the clearance between the sliding surface 44 and the cylinder wall 15 is greatest and the thickness of the oil film is most appropriate (indicated by "INTERMEDIATE" in FIG. 5). The thickness of the oil film decreases with increasing distance from the sliding surface circumferential end portion 48 toward the sliding surface centerline E in the piston circumferential direction G. As indicated by "THIN" in FIG. 5, the sliding surface central portion 46 has an area in which the oil film is insufficiently thick in comparison to the other regions.

In the aforementioned area where the thickness of the oil film is insufficiently thick, there is an an increased likelihood that the sliding surface 44 and the cylinder wall 15 may come in contact with each other without the intervention of oil. When the sliding surface 44 of the skirt 40 and the cylinder wall 15 come into direct contact with each other, it is possible for the cylinder wall 15 and the sliding surface 44 to suffer abrasion or seizure.

Accordingly, an art capable of making the thickness of the oil film on the sliding surface 44 more even by introducing oil from the sliding surface circumferential end portion 48, where the oil film is relatively thick, to the sliding surface central portion 46, where the oil film is relatively thin, in each operational state of the internal combustion engine 10 has been demanded of the skirt 40 of the piston 20.

Figure 6:
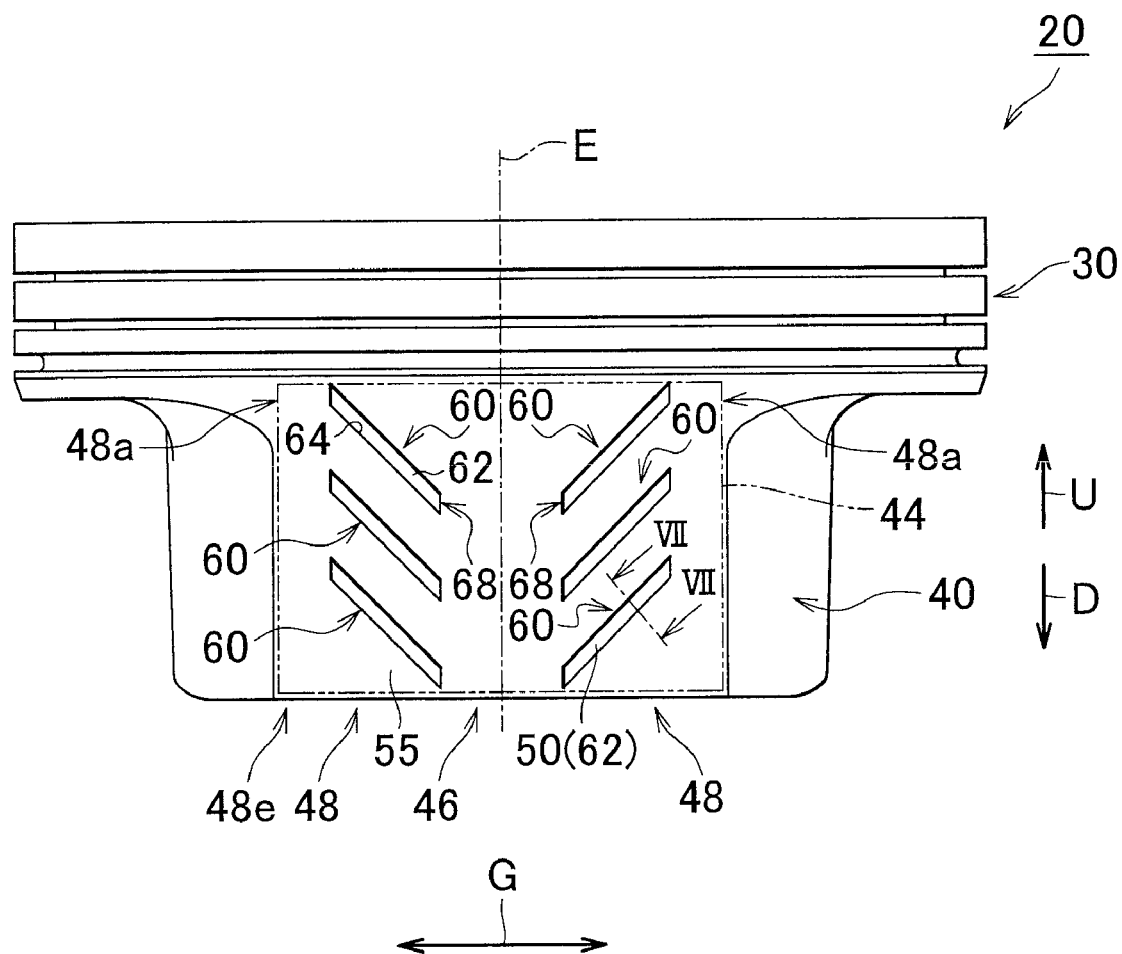
FIG. 6 is a view of the piston skirt according to the first embodiment of the invention as viewed from the sliding surface side.
Figure 7:
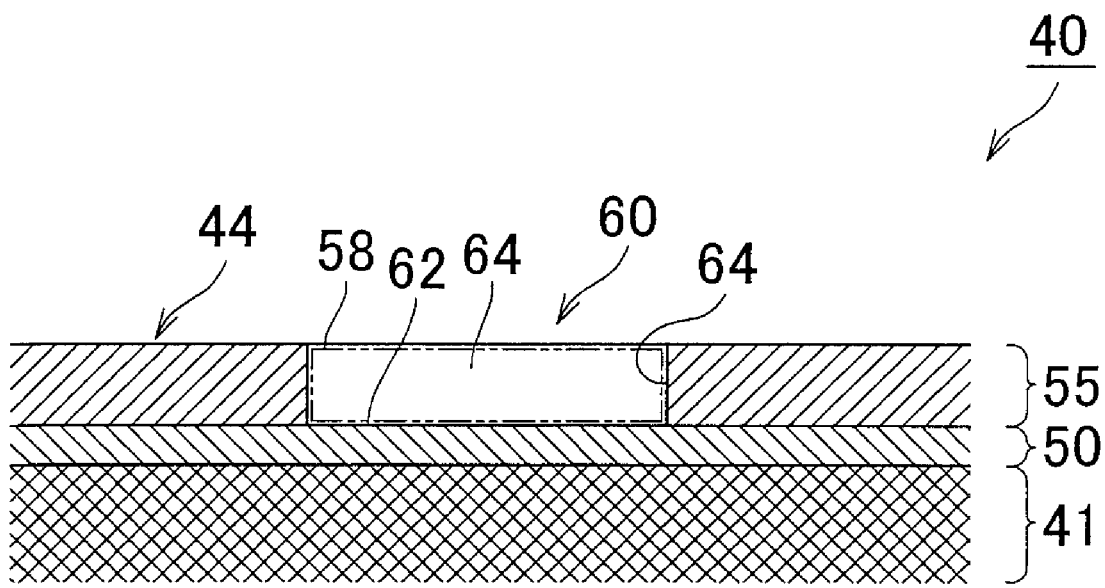
FIG. 7 is a cross-sectional view of a resin coat layer formed on a base material of the piston according to the first embodiment of the invention.
Figure 8:
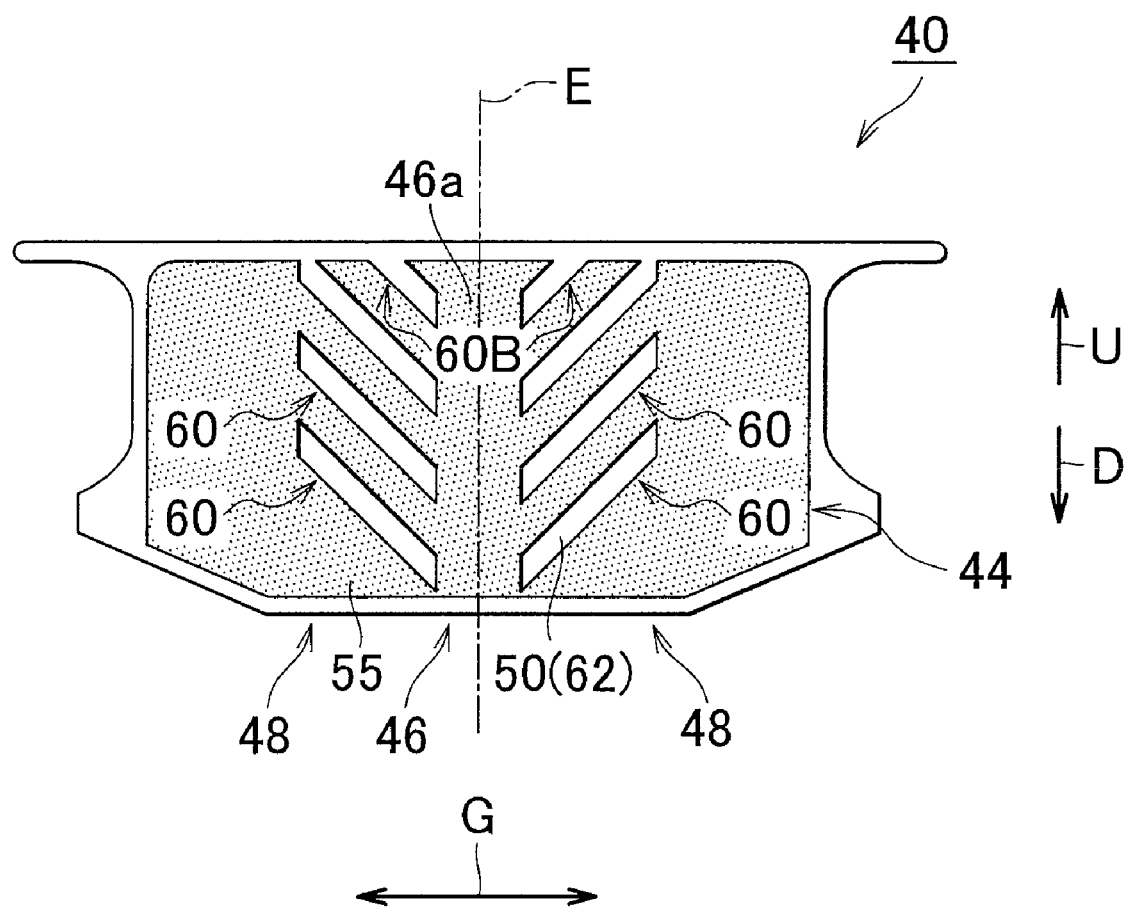
FIG. 8 is a view of a piston skirt according to a modification of the first embodiment of the invention as viewed from a sliding surface side.
Figure 9:
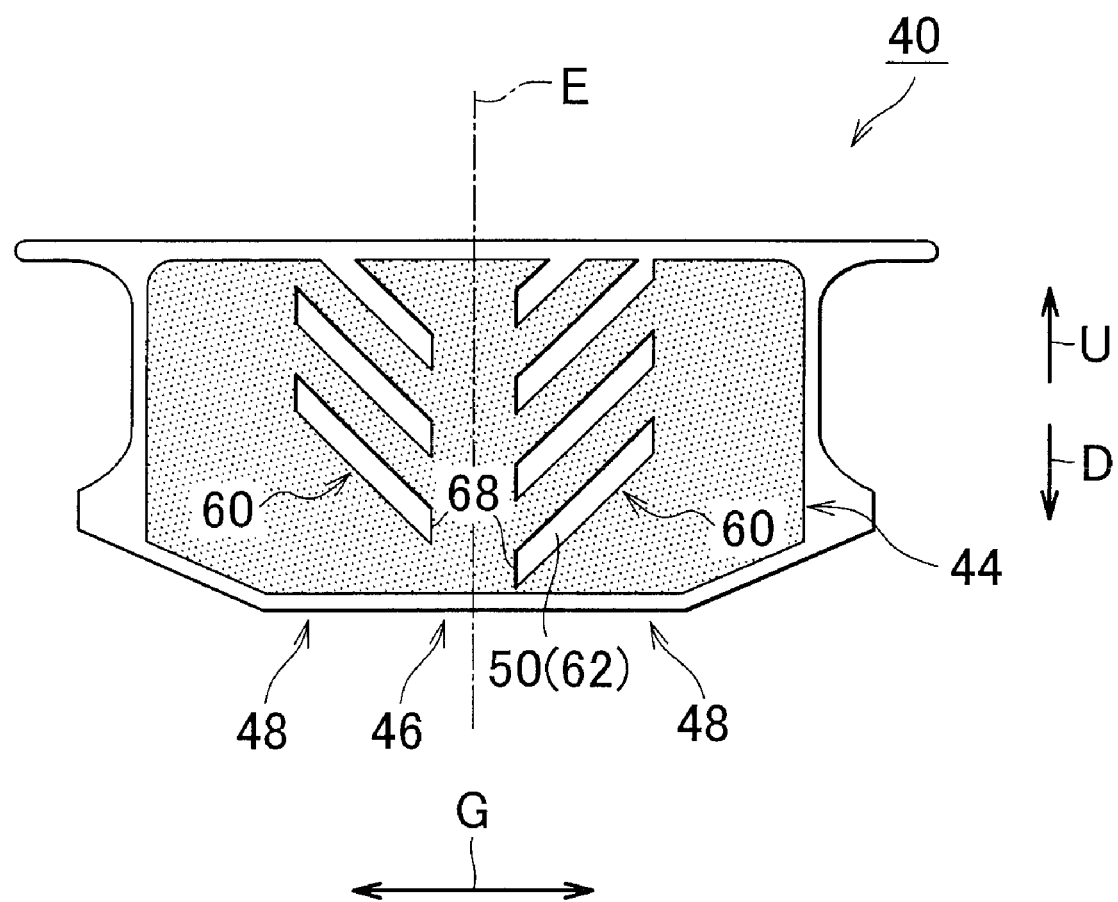
FIG. 9 is a view of a piston skirt according to another modification of the first embodiment of the invention as viewed from a sliding surface side.
Figure 10:
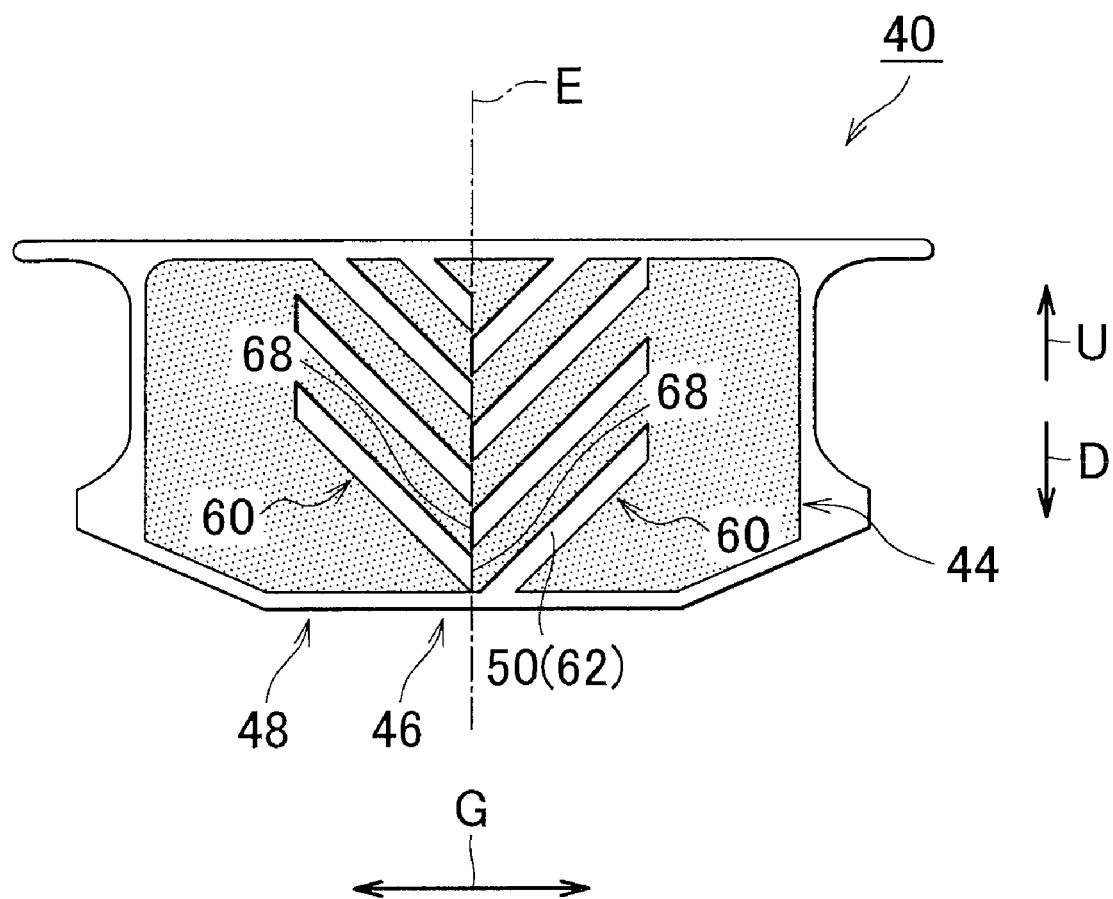
FIG. 10 is a view of a piston skirt according to still another modification of the first embodiment of the invention as viewed from a sliding surface side.

Thus, in the piston according to the invention, the sliding surface is provided with an oil repellent resin layer that contains a resin exhibiting oil repellency, and the oil repellent resin layer extends with an incline with respect to the sliding surface centerline as the center of the sliding surface in the piston circumferential direction. A description will be given below with reference to FIGS. 6 and 7. FIG. 6 is a view of the piston skirt from the sliding surface side. FIG. 7 is a cross-sectional view of a layer of a resin coating material formed on a base material 41 of the piston. FIG. 8 is a view of the sliding surface side of a piston skirt according to a first modification of the embodiment. FIG. 9 is a view of the sliding surface side of a piston skirt according to a second modification of the embodiment. FIG. 10 is a view of the sliding surface side of a piston skirt according to a third modification of the embodiment. FIG. 7 is a cross-sectional view taken along a line VII-VII of FIG. 6.

As shown in FIGS. 6 and 7, the piston 20 is mainly constructed of the base material 41 made of a metal such as an aluminum alloy or the like. To retain oil and reduce sliding resistance, the sliding surface 44, which slides along the cylinder wall 15, is coated with resin on the outer side of the base material 41 in a piston radial direction R (hereinafter referred to simply as "on the base material"). That is, the base material 41 of the skirt 40 is coated with a plurality of layers of resin (hereinafter referred to as resin coating layers), thereby constituting the sliding surface 44.

A solid lubricating resin layer 55 for reducing the sliding resistance on the cylinder wall 15 and an oil repellent resin layer 50 exhibiting oil repellency to move oil are formed on the base material 41 of the skirt 40. Thus, at least one of the solid lubricating resin layer 55 and the oil repellent resin layer 50 is exposed in the sliding surface 44 of the skirt 40.

As shown in FIG. 6, the band-shaped oil repellent resin layer 50 is exposed in the sliding surface 44 at a plurality of locations axisymmetrically with respect to the sliding surface centerline E. The oil repellent resin layer 50 assumes the shape of a band having a predetermined width and extends rectilinearly at each of the locations. The oil repellent resin layer 50 may extend at a predetermined angle of incline (e.g., 45°) with respect to the sliding surface centerline E so as to be located further from the piston head 30 side of the sliding surface 44 and closer to the skirt tail 40e side with increasing distance from the sliding surface circumferential end portion 48 toward the sliding surface centerline E.

The solid lubricating resin layer 55 is constructed of, for example, a mixture of a lubricating material such as molybdenum disulfide and a bonding material such as polyamide-imide resin. The solid lubricating resin layer 55 contains molybdenum disulfide, which is a solid common use lubricant. Instead of molybdenum disulfide, polytetrafluoroethylene (PTFE) or the like may also be used as the solid lubricating material. The composition of the solid lubricating resin layer 55 is set such that the solid lubricating resin layer 55 exhibits higher lubricity than the oil repellent resin layer 50.

The oil repellent resin layer 50 may be constructed of, for example, a mixture of a material exhibiting oil repellency such as fluorocarbon resin and a bonding material such as polyamide-imide resin. The fluorocarbon resin imparts high oil repellency to oil repellent resin layer 50. Various types of fluorocarbon resin such as PTFE and the like may also be used. The composition of the oil repellent resin layer 50 is set such that the oil repellent resin layer 50 exhibits higher oil repellency (greater ability to repel oil) than the aforementioned solid lubricating resin layer.

As shown in FIG. 7, these resin coating layers, namely, the solid lubricating resin layer 55 and the oil repellent resin layer 50 are provided on the base material 41 of the skirt 40 in a superimposed manner to thereby form a double layer on the base material 41. The oil repellent resin layer 50 is formed directly on the base material 41 of the skirt 40 over the entire surface thereof. Furthermore, the solid lubricating resin layer 55 is formed directly on the oil repellent resin layer 50. A plurality of through-holes 58 that also serve as guide grooves 60 described below are formed through the solid lubricating resin layer 55. The solid lubricating resin layer 55 in which the through-holes 58 are formed is superimposed on the oil repellent resin layer 50. The oil repellent resin layer 50 is thereby exposed in a band-like manner from the through-holes 58 on the sliding surface 44.

In this manner, the guide grooves 60, which have lateral walls 64 assuming a shape defined by the through-holes 58 of the solid lubricating resin layer 55 and allow oil from the sliding surface circumferential end portion 48 to be introduced to the sliding surface central portion 46, are formed in the sliding surface 44 of the skirt 40 (see FIG. 2). The oil repellent resin layer 50 is exposed at the groove bottoms 62 of the guide grooves 60, thereby constituting part of the sliding surface 44. The lateral walls 64 of the guide grooves 60 are constructed of the solid lubricating resin layer 55. As shown in FIG. 6, the guide grooves 60 with the groove bottoms 62 having the oil repellent resin layer 50 thereon extend at an incline with respect to the sliding surface centerline E so as to be located further from the piston head 30 of the sliding surface 44 and closer to the skirt tail 40e with increasing distance from the sliding surface circumferential end portion 48 toward the sliding surface centerline E.

When the piston 20 thus constructed reciprocates within the cylinder bore 14, the oil film on the sliding surface circumferential end portion 48 is thicker than the oil film on the sliding surface central portion 46. In addition, the piston rings of the piston 20 scrapes off oil adhering to the cylinder wall 15. Therefore, a large amount of oil adheres to a region 48a of the sliding surface circumferential end portion 48 near the piston head 30. On the sliding surface circumferential end portion 48, the oil flows into the guide grooves 60 due to the weight of the oil itself or blow-by gas passing around piston head 30 through gaps between the cylinder wall 15 and the oil ring.

On the sliding surface circumferential end portion 48, the oil that has flowed into the guide grooves 60 flows toward the sliding surface central portion 46 along the groove bottoms 62. The groove bottoms 62 are constructed of the oil repellent resin layer 50. In the guide grooves 60, therefore, the oil can favorably flow to the sliding surface central portion 46 without adhering to the groove bottoms 62. The oil that has flowed to ends 68 of the guide grooves 60 on the sliding surface centerline E side is supplied from there onto the solid lubricating resin layer 55 located on the sliding surface central portion 46. In this manner, the oil repellent resin layer 50 that is exposed at the groove bottoms 62 of the guide grooves 60 can introduce the oil on the sliding surface circumferential end portion 48 of the skirt 40 to the sliding surface central portion 46. Thus, the thickness of the oil film on the sliding surface 44 of the skirt 40 may be more evenly distributed.

As described above, in the piston 20 according to this embodiment of the invention, the oil repellent resin layer 50 inclined with respect to the sliding surface centerline E is provided on the sliding surface 44 of the skirt 40. During operation of the internal combustion engine 10, a large amount of oil adhering to the sliding surface circumferential end portion 48 is introduced to the sliding surface central portion 46 by the oil repellent resin layer 50 exposed in the sliding surface 44. As a result, the thickness of the oil film on the sliding surface 44 of the skirt 40 may be more evenly distributed.

In the piston 20 according to this embodiment of the invention, one of the solid lubricating resin layer 55 and the oil repellent resin layer 50 exhibiting oil repellency is exposed in the sliding surface 44, and the oil repellent resin layer 50 exhibits higher oil repellency than the solid lubricating resin layer 55. The solid lubricating resin layer 55, reduces the sliding resistance produced between the cylinder wall 15 and the sliding surface 44 of the skirt 40, and the oil repellent resin layer 50 introduces oil adhering to the sliding surface circumferential end portion 48 to the sliding surface central portion 46. The thickness of the oil film over the sliding surface 44 may thereby be made more even.

In the piston 20 according to this embodiment of the invention, the oil repellent resin layer 50 is located closer to the skirt tail 40e with increasing distance from the sliding surface circumferential end portion 48 toward the sliding surface centerline E. Therefore, oil on the sliding surface circumferential end portion 48 may be directed to flow toward the sliding surface central portion 46 along the oil repellent resin layer 50, with the aid of the weight of the oil itself or blow-by gas.

In the piston 20 according to this embodiment, the guide grooves 60 are formed in the sliding surface 44 and extend from the sliding surface circumferential end portion 48 toward the sliding surface central portion 46 with an incline with respect to the sliding surface centerline E, and the oil repellent resin layer 50 is exposed at the groove bottoms 62 of the guide grooves 60. Therefore, oil on the sliding surface circumferential end portion 48 may be directed into the grooves and caused to flow along the groove bottoms 62 of the oil repellent resin layer 50 toward the sliding surface central portion 46. The groove bottoms 62 are constructed of the oil repellent resin layer 50. Therefore, the oil from the sliding surface circumferential end portion 48 may be introduced to the sliding surface central portion 46 without adhering to the groove bottoms 62.

In the piston 20 according to this embodiment of the invention, two sets of the three guide grooves 60 having the groove bottoms 62 constructed of the oil repellent resin layer 50 are provided respectively on both the sides axisymmetrically with respect to the sliding surface centerline E. However, the structures of the guide grooves 60 and the oil repellent resin layer 50 should not be thus limited.

For example, as in the case of the modified example shown in FIG. 8, guide grooves 60B that extend at an incline with respect to the sliding surface centerline E so as to be located closer to the skirt tail 40e side with increasing distance from the sliding surface circumferential end portion 48 toward the sliding surface centerline E and are constructed with a shorter length than the other guide grooves 60 may be provided in the sliding surface 44 of the skirt 40 near piston head 30, and the groove bottoms 62 of the guide grooves 60B may have the oil repellent resin layer 50. By providing the guide grooves 60B, oil may also be introduced to the region 46a of the sliding surface central portion 46 near the piston head 30.

Further, as in the case of the modified embodiment shown in FIG. 9, the ends of the guide grooves 60 with the groove bottoms 62 having the oil repellent resin layer 50 thereon on the sliding surface central portion 46 side may be alternately disposed in a direction along the sliding surface centerline E on one side and the other side of the sliding surface 44 of the skirt 40 with respect to the sliding surface centerline E in the circumferential direction of the piston. By thus disposing the ends of the guide grooves 60 on the sliding surface central portion 46 side, namely, the ends of the oil repellent resin layer 50 on the sliding surface central portion 46 side, oil may be supplied to the sliding surface central portion 46 evenly in the direction along the sliding surface centerline E.

Further, as in the case of the modified embodiment shown in FIG. 10, the guide grooves 60 with the groove bottoms 62 having the oil repellent resin layer 50 thereon may extend to the sliding surface centerline E. By thus setting the ends of the guide grooves 60 on the sliding surface central portion 46 side along the sliding surface centerline E, oil from the sliding surface circumferential end portion 48 may be reliably directed to that region of the sliding surface central portion 46 through which the sliding surface centerline E extends.

Figure 11:
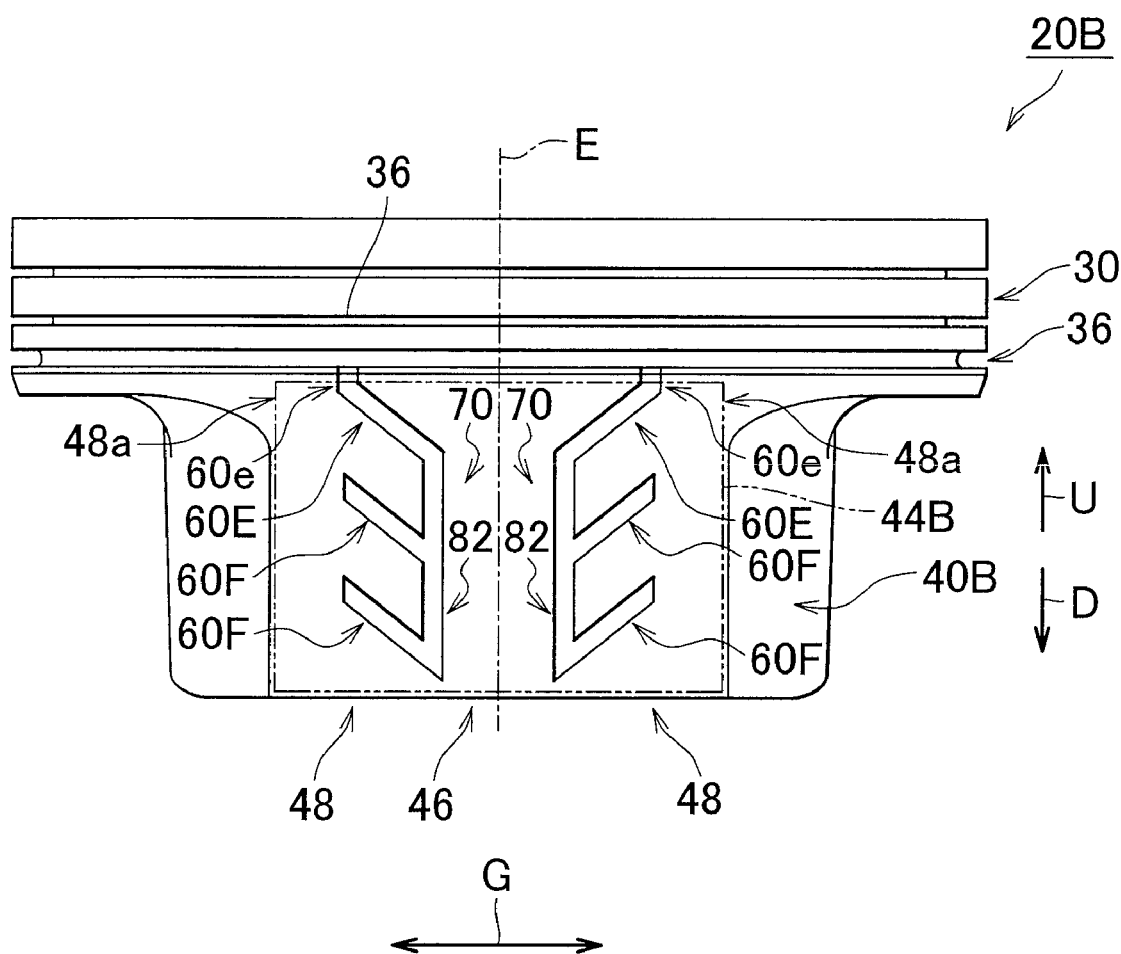
FIG. 11 is a view of a piston skirt according to the second embodiment of the invention as viewed from a sliding surface side.
Figure 12:
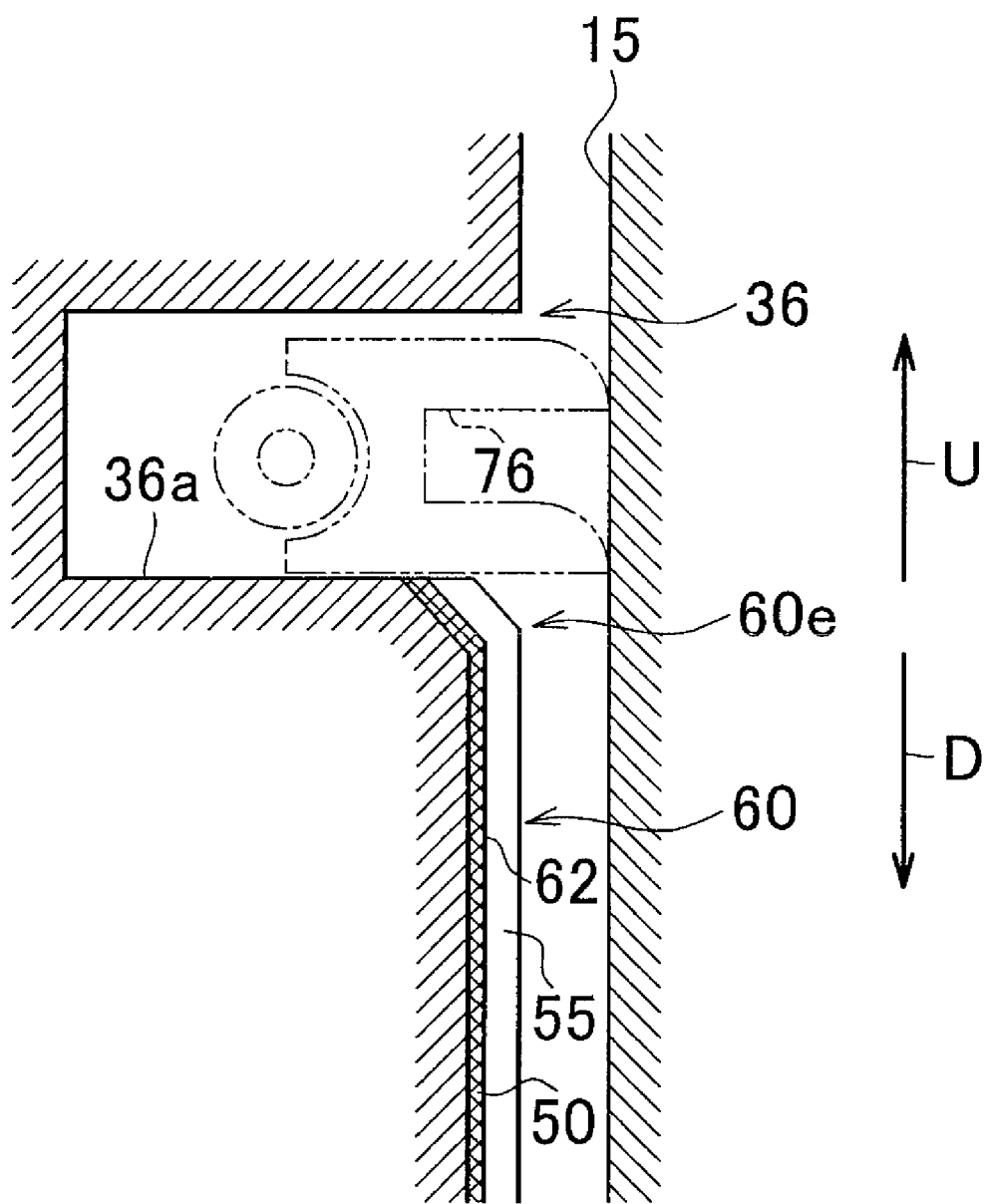
FIG. 12 is a view showing the relationship in arrangement between an oil ring groove and a guide groove in the piston according to the second embodiment of the invention.

The structure of a piston according to the second embodiment of the invention will be described using FIGS. 11 and 12. FIG. 11 is a view of a piston skirt from a sliding surface side. FIG. 12 is a view showing a relationship in arrangement between an oil ring groove and guide grooves. The piston according to this embodiment of the invention differs from that of the first embodiment in that the connection grooves for connecting ends of the guide grooves on the sliding surface centerline E side are provided in a sliding surface central portion of the skirt, and will be described hereinafter in detail. The structural elements substantially common to those of the first embodiment of the invention are denoted by the same reference symbols respectively and will not be described any further below.

In a piston 20B according to this embodiment of the invention, as shown in FIG. 11, two guide grooves 70 are formed in a sliding surface 44B of a skirt 40B axisymmetrically with respect to the sliding surface centerline E. The guide grooves 70 have inclined portions (60E, 60F) that extend with an incline with respect to the sliding surface centerline E so as to be located further from the top portion 30 of the sliding surface 44B and closer to the skirt tail 40e side with increasing distance from the sliding surface circumferential end portion 48 toward the sliding surface centerline E, and connection portions 82 that connect ends of the plurality of the inclined portions (60E, 60F) near the sliding surface centerline E.

In addition, ends 60e of those of the plurality of the inclined portions (60E, 60F) which are located closest to the piston head 30, connect with the oil ring groove 36. More specifically, as shown in FIG. 12, the groove bottoms 62 of the inclined portions (60E, 60F) of the guide grooves 60 continue to a lateral wall 36a of the oil ring groove 36 on the skirt tail 40e side, and the oil repellent resin layer 50 is exposed at the groove bottoms 62 of the inclined portions (60E, 60F). That is, the oil repellent resin layer 50 extends along the inclined portions 60E of the guide grooves 70 to reach the oil ring groove 36.

When the piston 20B thus constructed moves (descends) toward the crank and the oil ring 76 scrapes off surplus oil adhering to the cylinder wall 15, part of the oil is directed into the oil ring groove 36. The oil directed into the oil ring groove 36 flows into the ends 60e of the inclined portions 60E on the piston head 30 side (the sliding surface circumferential end portion 48 side), which are located on the crank side with respect to the oil ring groove 36. Thus, the oil scraped off from the cylinder wall 15 by the oil ring may be positively supplied to the guide grooves 70.

The inclined portions (60E, 60F) of the guide grooves 70 direct the oil that has flowed in from the ends 60e near the piston head 30 of the piston, namely, the ends 60e on the sliding surface 44B side, to flow toward the sliding surface centerline E and into the connection portions 82. The connection portions 82 join streams of oil that flow from the respective inclined portions (60E, 60F) toward the sliding surface centerline E side, and direct the oil to flow toward the skirt tail 40e along the sliding surface centerline E.

In this manner, the oil scraped off by the oil ring, provided in the sliding surface circumferential end portion 48 on the piston head 30 is introduced to the sliding surface central portion 46 on piston head 30 by the inclined portions (60E, 60F). The oil introduced to the sliding surface central portion 46 on the piston head 30 is swiftly caused to flow to the sliding surface central portion 46 and introduced to the region on the skirt tail 40e side by the connection portions 82. Thus, when the internal combustion engine 10 is operated at a high rotational speed and under a high load, lubricating oil may be swiftly supplied to the sliding surface central portion 46 where the oil film is thinnest.

As described above, the piston 20B according to this embodiment of the invention includes a plurality of the inclined portions (60E, 60F) that extend at an incline with respect to the sliding surface centerline E, and connection portions 82 that extend along the sliding surface centerline E to connect the ends of the respective inclined portions (60E, 60F) on the sliding surface centerline E side together, and the connection portions 82 join streams of oil from the respective inclined portions (60E, 60F). Thus, oil on the sliding surface circumferential end portion 48 is introduced to the sliding surface central portion 46 by the inclined portions (60E, 60F), and the oil introduced to the sliding surface central portion 46 may be swiftly directed toward the skirt tail 40e.

In the foregoing embodiment of the invention, the connection portions 82 extend along the sliding surface centerline E. However, the shape of the connection portions 82 should not be thus limited. The connection portions 82 may be inclined toward the sliding surface centerline E with decreasing distance from the skirt tail 40e.

Further, in the piston 20B according to this embodiment of the invention, the ends 60e of the inclined portions (60E, 60F) of the guide grooves 70, which are located closest to the piston head 30, communicate with the oil ring groove 36. Therefore, oil scraped off by the oil ring that is brought into the oil ring groove 36 is caused to flow from the ends 60e near the piston head 30 into the inclined portions (60E, 60F) of the guide grooves 70.

In each of the foregoing embodiments of the invention, the oil repellent resin layer 50 is provided directly on the base material 41 of the piston (20; 20B), the solid lubricating resin layer 55 is provided directly over the oil repellent resin layer 50; the guide grooves (60, 70) are formed in the solid lubricating resin layer 55, and the oil repellent resin layer 50 is exposed in the groove bottoms 62 of the guide grooves (60; 70). However, the structure of the guide grooves with the groove bottoms having the oil repellent resin layer thereon should not be thus limited.

Figure 13:
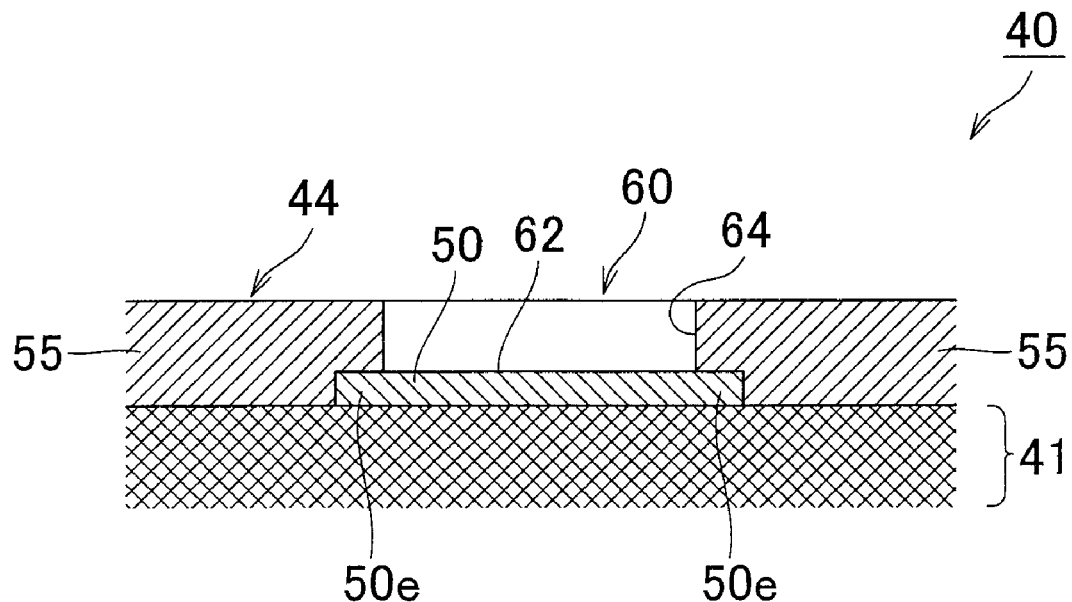
FIG. 13 is a cross-sectional view of a resin coat layer formed on a base material of a piston according to a modified embodiment of the invention.

For example, as shown in FIG. 13, the oil repellent resin layer 50 having a larger width than the grooves may be provided directly on the base material 41, and moreover, the solid lubricating resin layer 55 may be so provided as to cover the base material 41 and the ends of the oil repellent resin layer 50. By thus forming the oil repellent resin layer 50 and the solid lubricating resin layer 55, the oil repellent resin layer 50 is more reliably prevented from peeling off from the base material 41.

Figure 14:
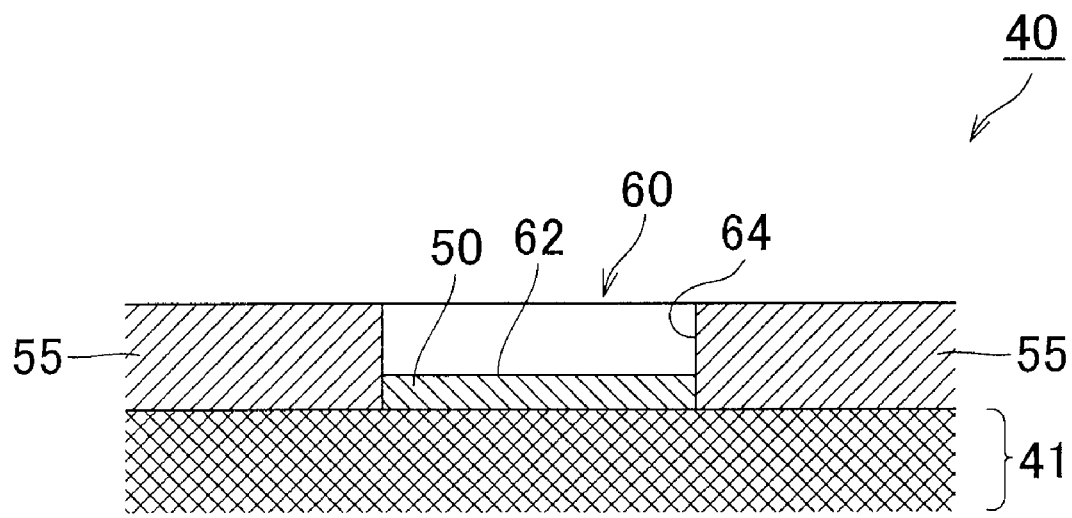
FIG. 14 is a cross-sectional view of a resin coat layer formed on a base material of a piston according to still another modified embodiment of the invention.

Further, as shown in FIG. 14, the oil repellent resin layer 50 and the solid lubricating resin layer 55 may be provided directly on the base material 41 in juxtaposition. The guide grooves (60; 70) with the groove bottoms 62 having the oil repellent resin layer 50 thereon may be implemented using a minimum amount of the material for the oil repellent resin layer 50.

Figure 15:
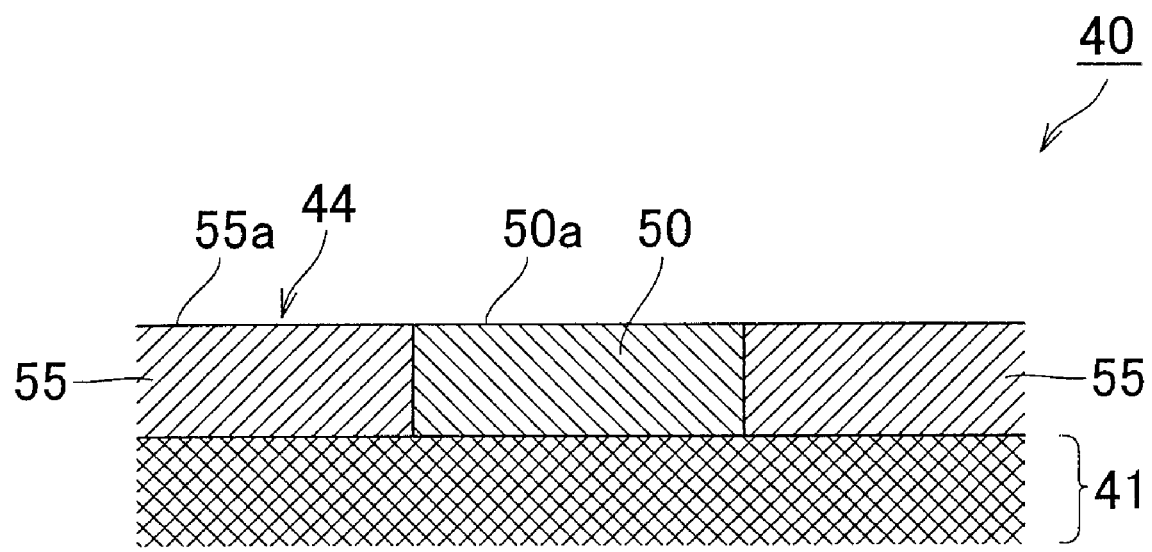
FIG. 15 is a cross-sectional view of a resin coat layer formed on a base material of a piston according to still another modified embodiment of the invention.

In each of the preceding embodiments, the guide grooves (60; 70) with the groove bottoms 62 having the oil repellent resin layer 50 thereon are provided in the sliding surface (44; 44B). However, the relationship in arrangement between the oil repellent resin layer 50 and the solid lubricating resin layer 55 on the sliding surface (44; 44B) should not be thus limited. Any relationship in arrangement may be adopted as long as oil from the sliding surface circumferential end portion 48 is introduced to the sliding surface central portion 46. For example, as shown in FIG. 15, a surface 50a of the oil repellent resin layer 50 and a surface 55a of the solid lubricating resin layer 55 may continue from each other on the sliding surface (44; 44B) without being provided with the guide grooves (60; 70). In the case of this construction, oil from the sliding surface circumferential end portion 48 may be introduced to the sliding surface central portion 46 with the aid of the gap between the cylinder wall 15 and the surface 50a of the oil repellent resin layer 50 on the sliding surface (44; 44B).

In each of the foregoing embodiments, the oil repellent resin layer 50 so extends as to be located closer to the skirt tail 40e increasing distance from the sliding surface circumferential end portion 48 toward the sliding surface centerline E. However, the angle of inclination of the oil repellent resin layer 50 with respect to the sliding surface centerline E should not be thus limited. For example, the oil repellent resin layer 50 may so extend closer towards the piston head 30 with increasing distance from the sliding surface circumferential end portion 48 toward the sliding surface centerline E. By thus setting the angle at which the oil repellent resin layer 50 extends, oil on the sliding surface circumferential end portion 48 may be introduced to the sliding surface central portion 46 with the aid of a shearing force applied to the oil as a result of a difference in speed between the cylinder wall 15 and the sliding surface (44; 44B) of the piston (20; 20B) when the piston (20; 20B) moves toward the crank.

As described above, the invention is useful to a piston for use in an internal combustion engine, and is especially suited for an internal combustion engine mounted as a prime mover on an automobile.

What is claimed is:

1. A piston for use in an internal combustion engine, comprising:
   a skirt having a sliding surface coated with an oil repellent resin layer, wherein:
   the oil repellent resin layer extends at an incline with respect to a sliding surface centerline in a circumferential direction of the piston,
   a solid lubricating resin layer and the oil repellent resin layer are exposed on the sliding surface, and
   the oil repellent resin layer exhibits higher oil repellency than the solid lubricating resin layer.

2. The piston according to claim 1, wherein the oil repellent resin layer is located closer toward a skirt tail with increasing distance from a sliding surface circumferential end portion, which is an end portion of the sliding surface in the circumferential direction of the piston, toward the sliding surface centerline.

3. The piston according to claim 1, wherein a guide groove is formed in the sliding surface,
   the guide groove extends at an incline with respect to the sliding surface centerline from a sliding surface circumferential end portion toward a sliding surface central portion to introduce lubricating oil from the sliding surface circumferential end portion to the sliding surface central portion, and
   the oil repellent resin layer is exposed along at least part of the bottom of the guide groove.

4. The piston according to claim 3, wherein the guide groove has a plurality of inclined portions that extend at an incline with respect to the sliding surface centerline, and a connection portion that connects the ends of the respective inclined portions that are in proximity to the sliding surface centerline.

5. The piston according to claim 4, wherein the connection portion extends along the sliding surface centerline.

6. The piston according to claim 4, wherein that one end of the inclined portions of the guide groove, which is located closest to a top portion side, contacts a wall surface of a lateral wall that forms an oil ring groove.

7. The piston according to claim 3, wherein the guide groove is provided on both sides of the sliding surface central line, and
   one end of each inclined portion on the sliding surface central line side is offset from the other end thereof on the sliding surface central line side.

8. A piston for use in an internal combustion engine, comprising:
   a skirt having a sliding surface coated with an oil repellent resin layer, wherein:
   the oil repellent resin layer extends at an incline with respect to a sliding surface centerline in a circumferential direction of the piston,
   a guide groove is formed in the sliding surface,
   the guide groove extends at an incline with respect to the sliding surface centerline from a sliding surface circumferential end portion toward a sliding surface central portion to introduce lubricating oil from the sliding surface circumferential end portion to the sliding surface central portion,
   the oil repellent resin layer is exposed along at least part of the bottom of the guide groove,
   the sliding surface is constructed by superimposing a plurality of resin layers over a base material of the piston,
   the oil repellent resin layer is provided directly over the base material,
   a solid lubricating resin layer is provided directly over the oil repellent resin layer,
   the guide groove is formed in the solid lubricating resin layer, and
   the oil repellent resin layer is exposed along the bottom of the guide groove.

9. A piston for use in an internal combustion engine, comprising:
   a skirt having a sliding surface coated with an oil repellent resin layer, wherein:
   the oil repellent resin layer extends at an incline with respect to a sliding surface centerline in a circumferential direction of the piston, a guide groove is formed in the sliding surface, the guide groove extends at an incline with respect to the sliding surface centerline from a sliding surface circumferential end portion toward a sliding surface central portion to introduce lubricating oil from the sliding surface circumferential end portion to the sliding surface central portion, the oil repellent resin layer is exposed along at least part of the bottom of the guide groove, the oil repellent resin layer is provided directly on that section of a base material of the piston which corresponds to the guide groove, a solid lubricating resin layer is so provided on the base material as to sandwich the oil repellent resin layer, the guide groove is formed in the solid lubricating resin layer, and the oil repellent resin layer is exposed along the bottom of the guide groove.

10. A piston for use in an internal combustion engine, comprising:

a skirt having a sliding surface coated with an oil repellent resin layer, wherein:

the oil repellent resin layer extends at an incline with respect to a sliding surface centerline in a circumferential direction of the piston, a guide groove is formed in the sliding surface, the guide groove extends at an incline with respect to the sliding surface centerline from a sliding surface circumferential end portion toward a sliding surface central portion to introduce lubricating oil from the sliding surface circumferential end portion to the sliding surface central portion, the oil repellent resin layer is exposed along at least part of the bottom of the guide groove, a solid lubricating resin layer is provided directly on a base material of the piston, the guide groove is formed in the solid lubricating resin layer, and the oil repellent resin layer is provided on the base material at the guide groove.

* * * * *